(12) United States Patent
Caldwell

(10) Patent No.: US 9,606,262 B1
(45) Date of Patent: Mar. 28, 2017

(54) RAIN GAUGE

(71) Applicant: DALEN PRODUCTS, INC., Knoxville, TN (US)

(72) Inventor: E. Neal Caldwell, Knoxville, TN (US)

(73) Assignee: Dalen Products, Inc., Knoxville, TN (US)

( * ) Notice: Subject to any disclaimer, the term of this patent is extended or adjusted under 35 U.S.C. 154(b) by 0 days.

(21) Appl. No.: 14/933,792

(22) Filed: Nov. 5, 2015

(51) Int. Cl.
*G01W 1/00* (2006.01)
*G01W 1/14* (2006.01)

(52) U.S. Cl.
CPC .................................... *G01W 1/14* (2013.01)

(58) Field of Classification Search
None
See application file for complete search history.

(56) References Cited

U.S. PATENT DOCUMENTS

| | | | | |
|---|---|---|---|---|
| 2,821,852 | A | | 2/1958 | Hastings |
| 3,487,684 | A | | 1/1970 | Chadwick |
| 3,776,504 | A | * | 12/1973 | Wiley ..................... F25C 1/243 229/406 |
| 4,106,336 | A | | 8/1978 | Marley |
| 4,222,547 | A | * | 9/1980 | Lalonde ................... F25C 1/243 249/120 |
| 5,038,606 | A | * | 8/1991 | Geschwender ......... G01W 1/14 73/170.17 |
| D342,264 | S | * | 12/1993 | Pittman .......................... D15/90 |
| 6,363,781 | B1 | * | 4/2002 | Moore .................... G01W 1/14 73/170.17 |
| 6,494,089 | B1 | * | 12/2002 | Geschwender ......... G01F 23/02 73/170.21 |
| 6,609,422 | B1 | * | 8/2003 | Geschwender ......... G01W 1/14 73/170.22 |
| 7,152,468 | B1 | * | 12/2006 | Peterson ................. G01W 1/14 73/170.17 |
| 7,159,455 | B1 | * | 1/2007 | Leonard .................. G01W 1/14 73/170.17 |
| 7,543,493 | B2 | * | 6/2009 | Geschwender ......... G01W 1/14 73/170.17 |
| 7,552,632 | B2 | * | 6/2009 | Runge .................. A01G 25/167 73/170.16 |
| 8,555,714 | B2 | * | 10/2013 | Chae ....................... G01W 1/14 73/170.17 |
| 2002/0081408 | A1 | | 6/2002 | Spaller et al. |

OTHER PUBLICATIONS

All Weather Rain Gauge, Land EKG Rain Gauge—Range Monitoring, Land Management Products http://www.landekg.com/raingauge.htrr.
F & S Irrigation, B847 Large Rain Gauge http://kbbestbuys.com/products/B84.
World's Coolest Rain Gauge / Pond Yard Decorations http://www.drsfostersmith.com/product/prod_display.cfm?pcatid=2760.

* cited by examiner

*Primary Examiner* — Jermaine Jenkins
(74) *Attorney, Agent, or Firm* — Luedeka Neely Group, PC (57) ABSTRACT

A rain gauge that is resistant to damage from freezing water. The gauge includes a collector defining an open top vessel with a closed bottom for collecting water. The collector includes a plurality of tapered and curved sidewalls with curved corners connecting the sidewalls, the curved sidewalls having a direction of curvature and the curved corners having a direction of curvature opposite the direction of curvature of the curved sidewalls. The curved sidewalls tend to flex sufficiently when water collected therein freezes and expands, and thereby resists breakage from freezing of collected water.

6 Claims, 12 Drawing Sheets

RAIN GAUGE

FIELD

This disclosure relates to rain gauges. More particularly, this disclosure relates to rain gauges that are both aesthetically pleasing and resistant to breakage from cycles of freezing and thawing.

BACKGROUND

In many climates, rainfall is more prevalent than snow in the Winter. These climates feature mostly above freezing weather, with periods of below freezing temperatures. In these climates, most people do not winterize and bring in items such as rain gauges, as it is desired to know the rainfall amounts. In the event a sustained period of freezing temperatures is experienced, rain gauges left out typically will undergo multiple cycles of freezing, thawing, refreezing and, over time break because of this.

The present disclosure advantageously provides a rain gauge structures that are both aesthetically pleasing and resistant to breakage from cycles of freezing and thawing.

SUMMARY

The above and other needs are met by rain gauges configured to resist breakage in conditions where they experience repeated cycles of freezing and thawing.

In one aspect, rain gauges according to the disclosure include a collector defining an open top vessel with a closed bottom for collecting water. The collector includes a plurality of tapered and curved sidewalls with curved corners connecting the sidewalls.

The curved sidewalls have a direction of curvature and the curved corners have a direction of curvature opposite the direction of curvature of the curved sidewalls. The curved sidewalls tend to flex sufficiently when water collected therein freezes and expands, and thereby resists breakage from freezing of collected water.

The collector may also include a three-dimensional projection rising from the bottom of the interior of the collector, and decreasing in dimension as a function of height. The projection cooperates with the upwardly expanding dimension of the collector attributable to its taper and tends to force expanding ice upwards in the collector.

BRIEF DESCRIPTION OF THE DRAWINGS

Further advantages of the disclosure are apparent by reference to the detailed description when considered in conjunction with the figures, which are not to scale so as to more clearly show the details, wherein like reference numbers indicate like elements throughout the several views, and wherein.

DETAILED DESCRIPTION

With reference to FIGS. 1-6, there is shown a rain gauge 10 according to one embodiment of the disclosure. The rain gauge 10 is configured to be both aesthetically pleasing and to resist breakage in freezing weather, including conditions in which the rain gauge experiences repeated cycles of freezing and thawing.

Figure 1:
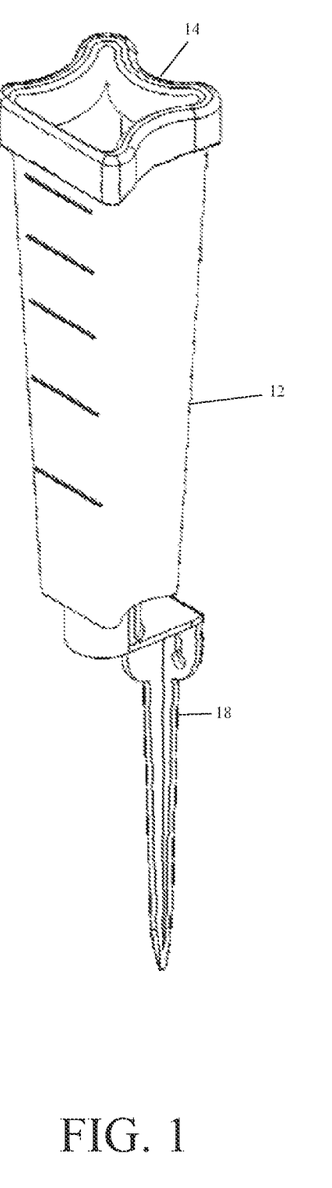
FIG. 1 is a perspective view of a rain gauge according to the disclosure.
Figure 2:
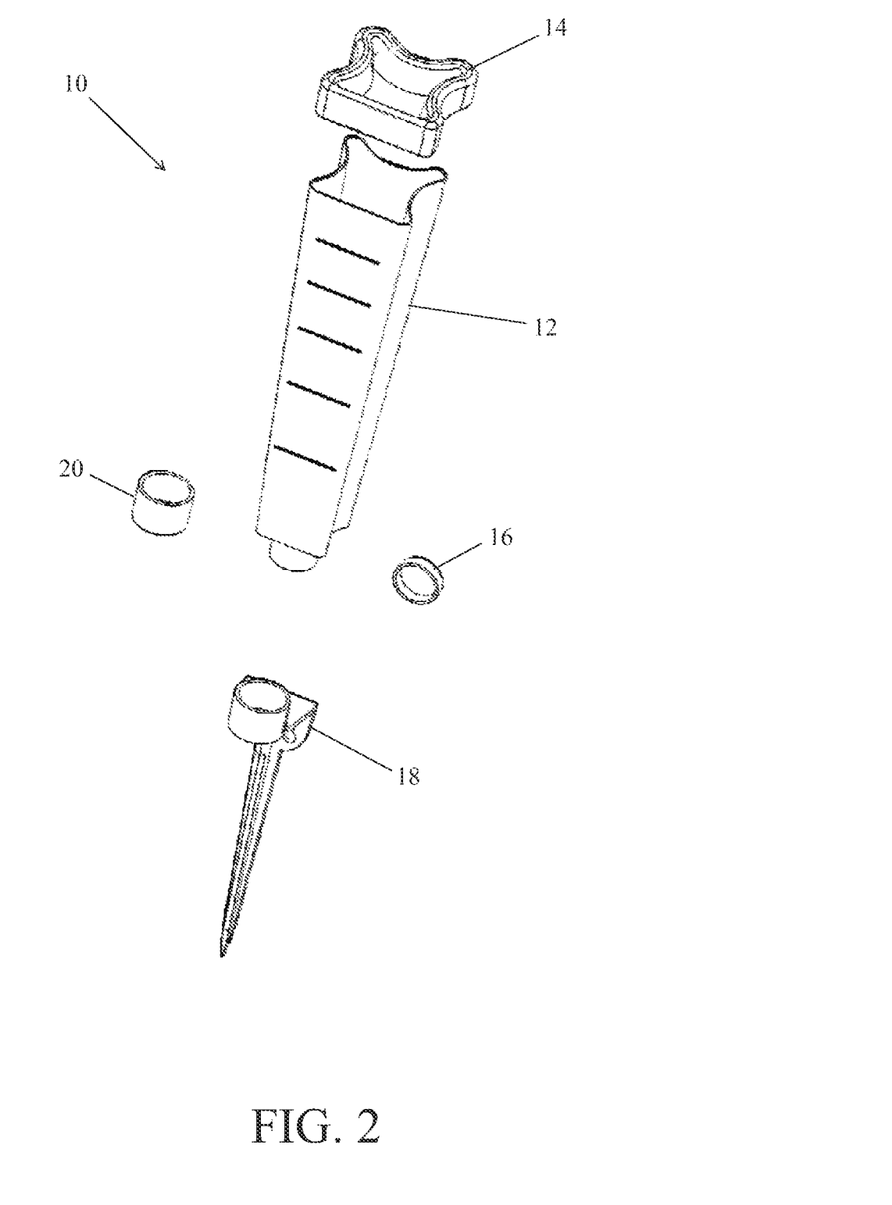
FIG. 2 is an exploded view of the rain gauge of FIG. 1.
Figure 3:
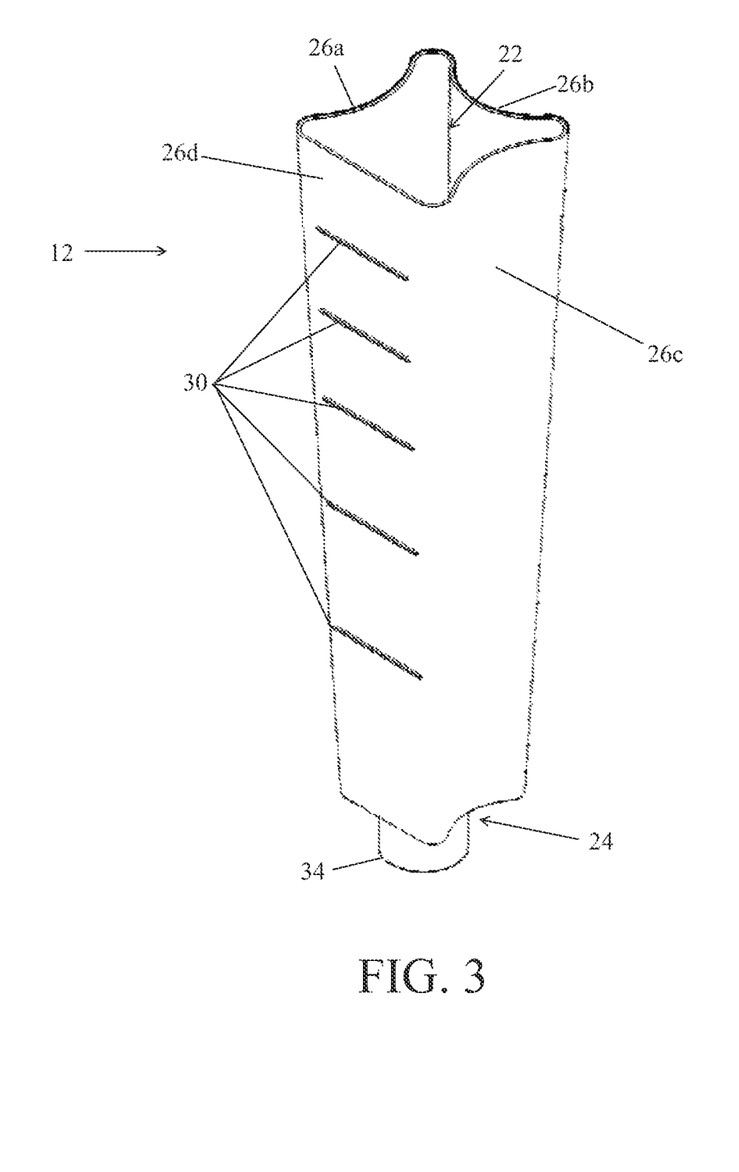
FIG. 3 is a perspective view of a water collector component of the rain gauge of FIG. 1.

The rain gauge 10 includes a water collector 12, a cap 14, a float 16, and a ground mount 18, all preferably of molded plastic construction. Also shown is a post mount 20 that may be used in place of the ground mount 18. The components of the rain gauge 10 are desirably of molded plastic construction.

The water collector 12 is advantageously configured to be both aesthetically pleasing and to resist breakage in weather conditions in which the rain gauge experiences repeated cycles of freezing and thawing. The water collector 12 is generally an elongate cylinder having an open top 22 and a closed bottom 24. The collector 12 is of molded plastic construction. The plastic utilized for the collector 12 is desirably opaque, and preferably clear. The cap 14 is friction fit onto the rim of the open top 22 to provide additional aesthetics.

The collector 12 includes a plurality of tapered and curved sidewalls 26a, 26b, and 26c. All of the sidewalls may be curved, but it is preferred that one of the sidewalls be a tapered and planar sidewall 26d. The planar sidewall 26d is preferred for ease of reading the measurement level of water collected in the collector 12.

It will be appreciated that the collector 12, while shown having four sidewalls, could be made having fewer or more sidewalls. An alternate embodiment shown in FIGS. 7-13 shows a collector having more sidewalls, and another alternate embodiment of a collector shown in FIG. 14 has fewer sidewalls.

Returning to FIGS. 1-6, curved corners 28a-28d connect the sidewalls 26a-26d. At least one of the sidewalls, such as the planar sidewall 26d may include indicia, such as lines 30, denoting the rainfall amounts. For example, each of the lines 28 indicates one inch and numerals indicating the inches may be included also. The float 16 may be provided as by a of hollow plastic air or foam filled ring that floats on water in the collector 12 and is visible through the collector 12 so that a user may see the float 16 adjacent the lines 30 to quickly tell the amount of water in the collector 12 to indicate the rainfall amount.

The collector 12 is configured to have both curved corners and curved sidewalls. It has been observed that this structure provides a structure that will tend to flex sufficiently when water stored therein freezes and expands, and thereby resists breakage.

Conventional structures do not flex sufficiently to resist breakage. The curvature of the sidewalls 26a-26c is preferably concave, with the curvature being inwardly into the collector 12. In conjunction with concave sidewalls, the curvature of the corners is convex, or opposite of that of the sidewalls, with the curvature being outwardly of the collector 12.

Figure 4:
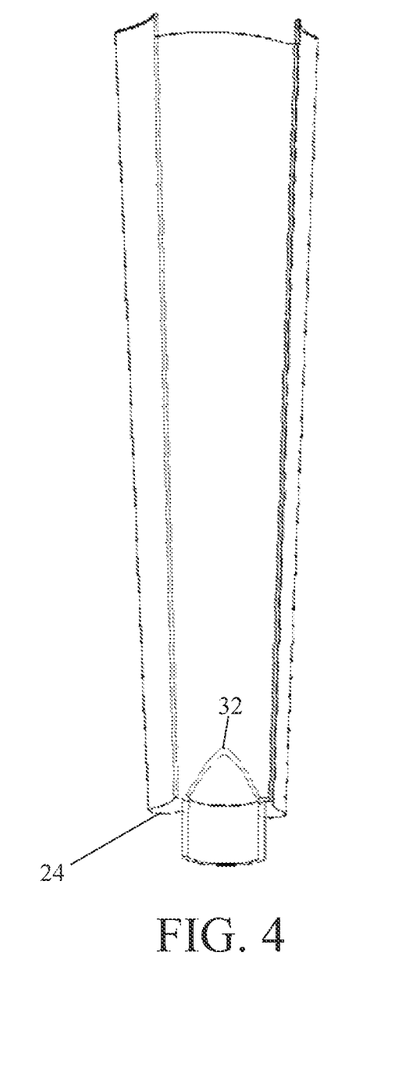
FIG. 4 is a cross-sectional view of the water collector of FIG. 3.
Figure 5:
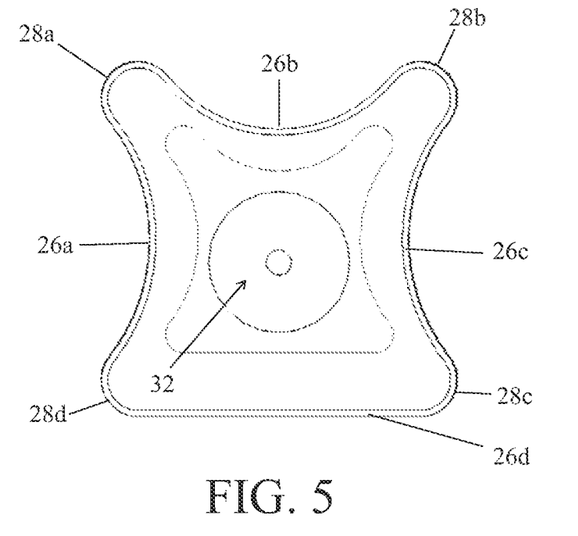
FIG. 5 is a top end view of the water collector of FIG. 3.

Another feature of the gauge structure that serves to render the collector 12 resistant to breakage during freezing is providing a three-dimensional projection rising from the bottom of the interior of the collector, and decreasing in dimension as a function of height.

In this regard, a three-dimensional projection in the form of a cone 32 is shown located at the interior of the closed bottom 24. Without being bound by theory, it is believed that the cone 28 cooperates with the upwardly expanding dimension of the collector 12 attributable to its taper and tends to force expanding ice upwards in the collector 12. The cone 28 may be either hollow or solid.

Figure 6:
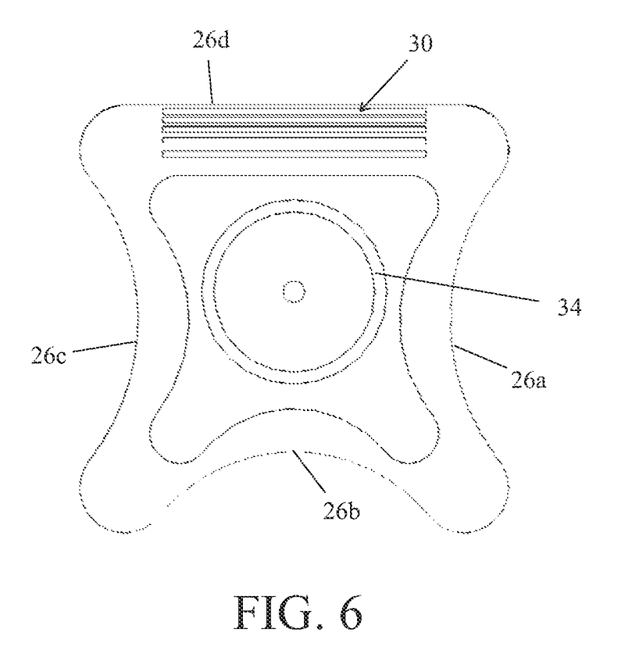
FIG. 6 is a bottom end view of the water collector of FIG. 3.

A mounting projection 34 preferably extends from the bottom 24 of the collector 12. The projection 34 is ring shaped and may friction fit into a mounting structure such as the ground mount 18 or the post mount 20 to vertically support the collector 12 to serve as a rain gauge.

Turning now to FIGS. 7-13, there is shown an alternate embodiment of a water collector 50 for providing a water collection rain gauge according to the disclosure. The collector 50 is both aesthetically pleasing and to resist breakage in freezing weather, including conditions in which the rain gauge experiences repeated cycles of freezing and thawing. The collector 50 may be configured to include a cap, measurement, a float, and mounts in the manner of the rain gauge 10 if desired.

The collector 50 has an open top and a closed bottom, with a plurality of tapered and curved sidewalls 52a-52g, and preferably one tapered and planar sidewall 52h for location of measurement indicia. Curved corners 54a-54h connect the sidewalls 52a-52h. At least one of the sidewalls, such as the planar sidewall 52h may include indicia denoting the rainfall amounts.

Figure 7:
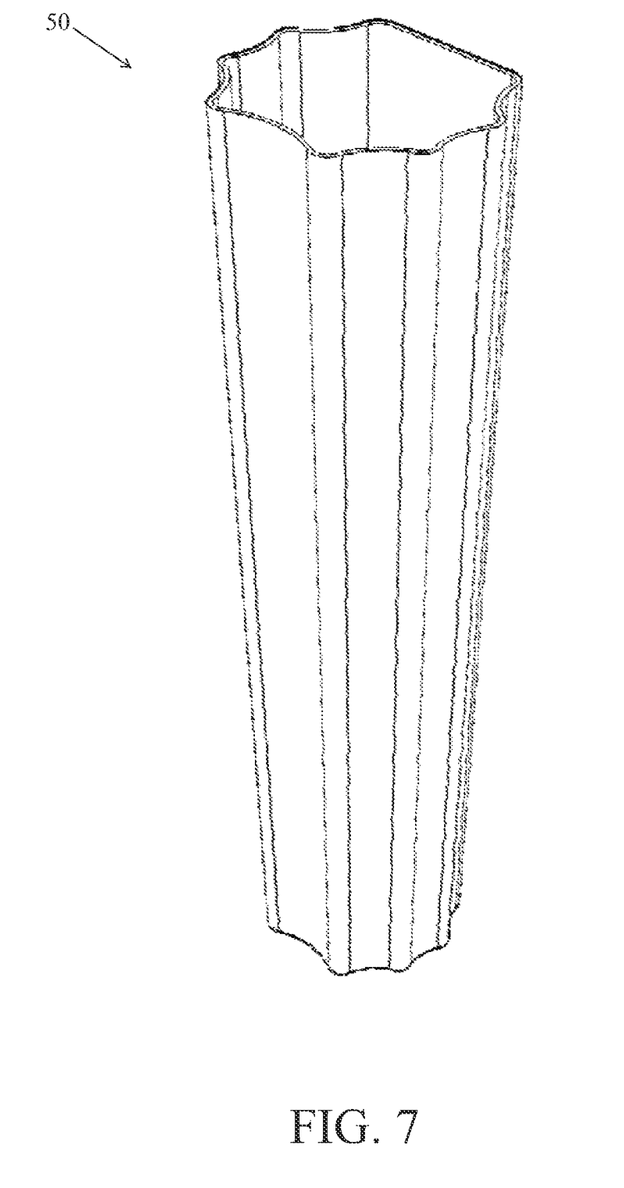
FIGS. 7-9 are perspective views of an alternate embodiment of a water collector for a rain gauge according to the disclosure.
Figure 8:
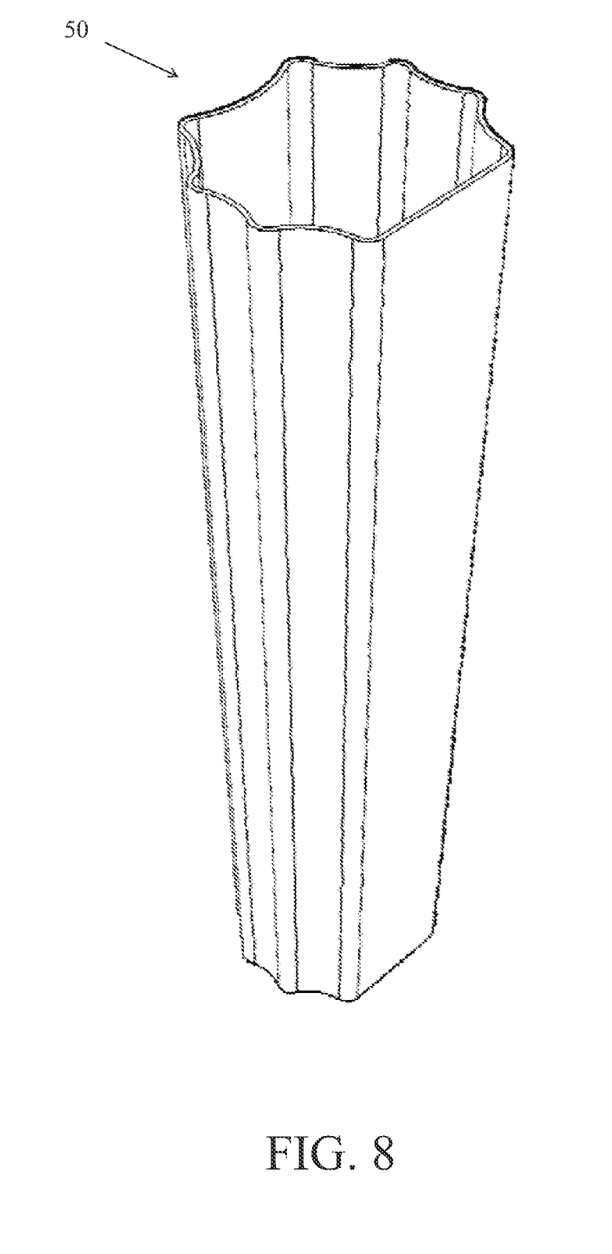
Figure 9:
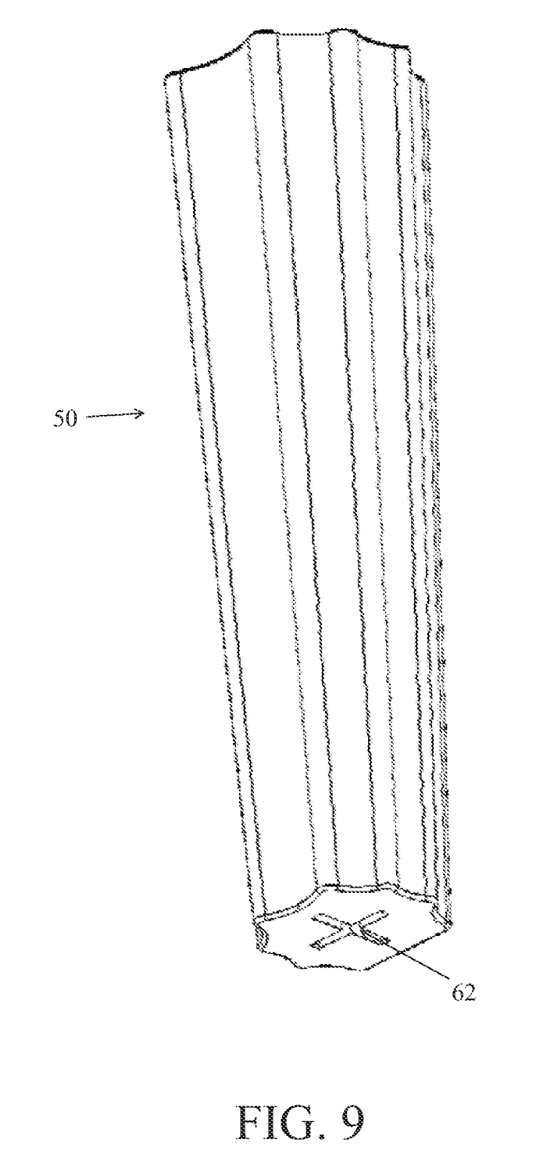

The collector 50 is configured to have both curved corners and curved sidewalls, it has been observed that this structure provides a structure that will tend to flex sufficiently when water stored therein freezes and expands, and thereby resists breakage. Conventional structures do not flex sufficiently to resist breakage.

The curvature of the sidewalls 52a-52c is preferably concave, with the curvature being inwardly into the collector 50. In conjunction with concave sidewalls, the curvature of the corners is convex, or opposite of that of the sidewalls, with the curvature being outwardly of the collector 50.

Figure 10:
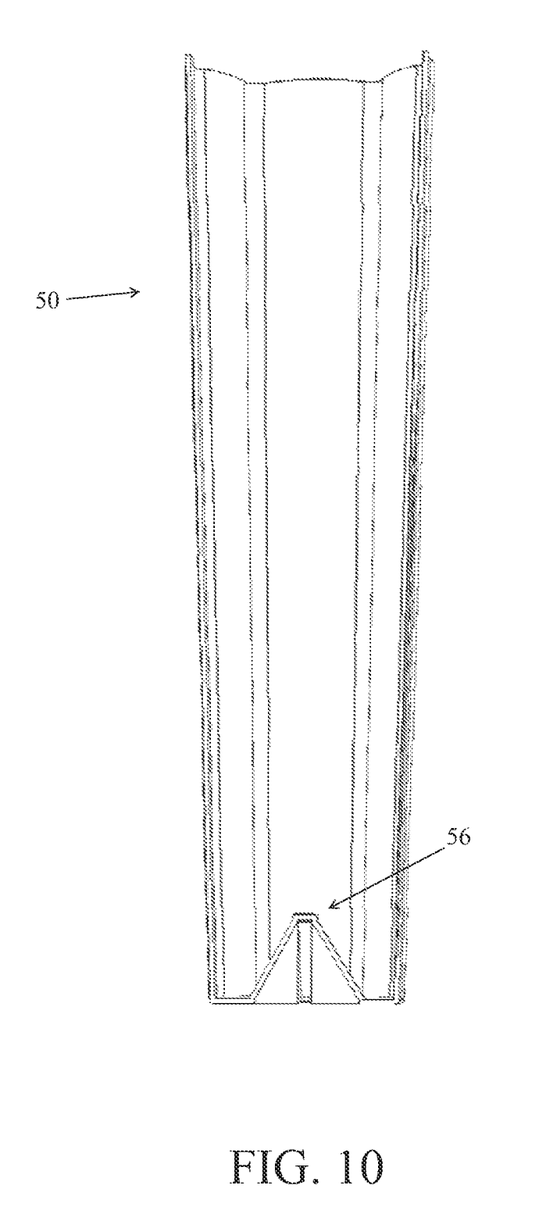
FIG. 10 is a cross-sectional view of the water collector of FIGS. 7-9.

Another feature of the gauge structure that serves to render the collector 50 resistant to breakage during freezing is providing a three-dimensional projection rising from the bottom of the interior of the collector, and generally decreasing in dimension as a function of height.

Figure 11:
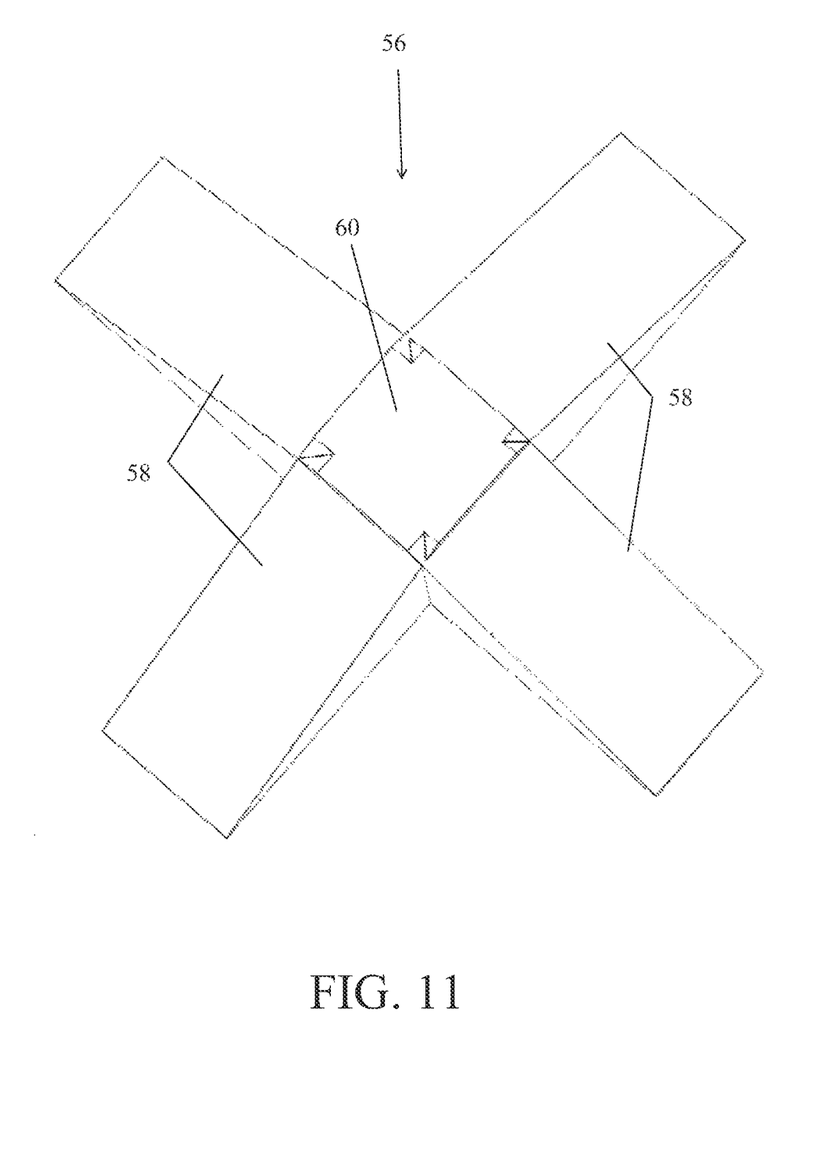
FIG. 11 is a perspective view of a cone component of the collector of FIGS. 7-9.
Figure 12:
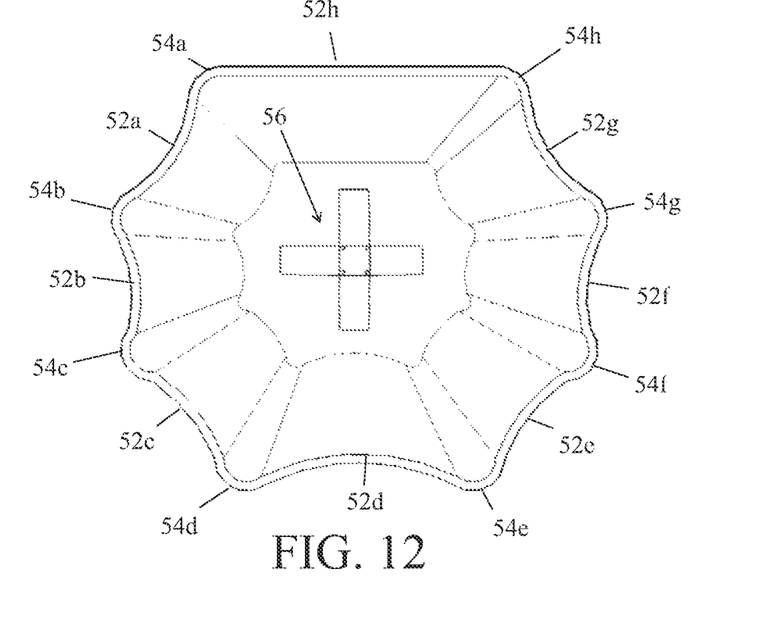
FIG. 12 is a top end view of the water collector of FIGS. 7-9.

The collector 50 includes a three-dimensional projection in the form of a pyramid 56 is shown located at the interior of the closed bottom of the collector 50. The pyramid 56 may have wholly continuous surfaces or be a plurality of end to end joined ramps 58 as shown. The ramps 58 meet at a peak 60 that may be flat or preferably conical or tapered.

Figure 13:
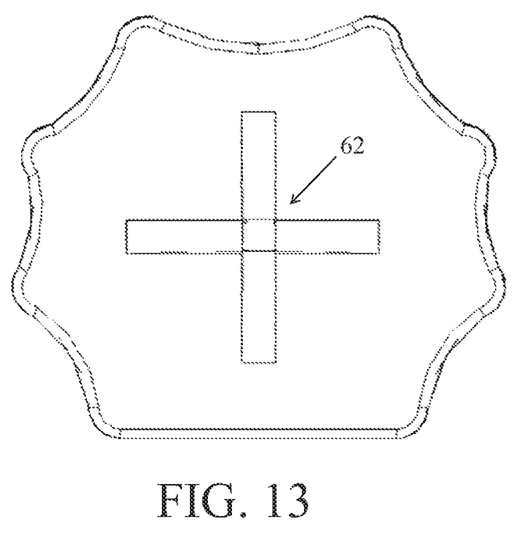
FIG. 13 is a bottom end view of the water collector of FIGS. 7-9.

The pyramid 56 may be molded in a manner to provide cross-shaped recess 62 at the exterior of the bottom of the collector 50 that is suitable for receiving a corresponding shaped surface of a mount for mounting the collector 50 to maintain it in an upright orientation for use as a rain gauge.

Without being bound by theory, it is believed that the pyramid 56 cooperates with the upwardly expanding dimension of the collector 50 attributable to its taper and tends to force expanding ice upwards in the collector 50. It will be appreciated that various a three-dimensional projection shapes may be configured to rise from the bottom of the interior of the collector, and decrease in dimension as a function of height.

Figure 14:
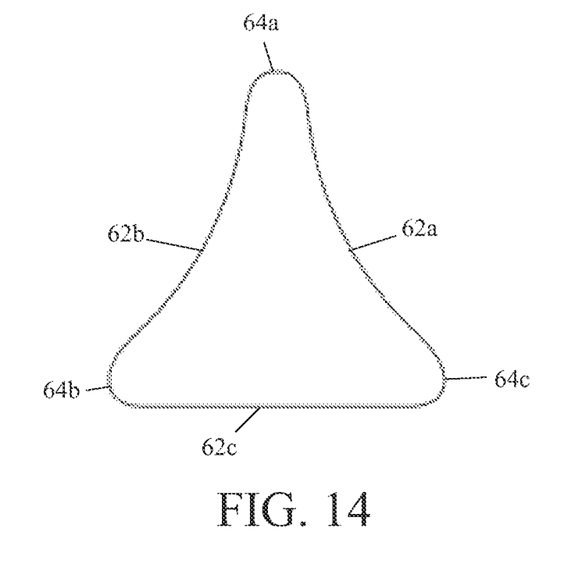
FIG. 14 shows the cross-section of another alternate embodiment of a water collector for a rain gauge according to the disclosure.

Turning now to FIG. 14, there is shown yet another embodiment of a water collector 70 for providing a water collection rain gauge according to the disclosure. The collector 60 is both aesthetically pleasing and to resist breakage in freezing weather, including conditions in which the rain gauge experiences repeated cycles of freezing and thawing. The collector 60 may be configured to include a cap, measurement, a float, and mounts in the manner of the rain gauge 10 if desired.

The collector 60 has an open top and a closed bottom, with a plurality of tapered and curved sidewalls 62a-62b, and preferably one tapered and planar sidewall 62c for location of measurement indicia. Curved corners 64a-64c connect the sidewalls 62a-62c. At least one of the sidewalls, such as the planar sidewall 62a may include indicia denoting the rainfall amounts.

The collector 60 is configured to have both curved corners and curved sidewalls. It has been observed that this structure provides a structure that will tend to flex sufficiently when water stored therein freezes and expands, and thereby resists breakage. Conventional structures do not flex sufficiently to resist breakage. The curvature of the sidewalls 62a-62b is preferably concave, with the curvature being inwardly into the collector 60. In conjunction with concave sidewalls, the curvature of the corners is convex, or opposite of that of the sidewalls, with the curvature being outwardly of the collector 60.

The collector 60 may also preferably include a three-dimensional projection rising from the bottom of the interior of the collector, and decreasing in dimension as a function of height.

Rain gauges according to the disclosure are advantageously resistant to breakage from cycles of freezing and thawing, and to have aesthetically pleasing appearances.

The foregoing description of preferred embodiments for this disclosure has been presented for purposes of illustration and description. It is not intended to be exhaustive or to limit the disclosure to the precise form disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

What is claimed is:

1. A rain gauge, comprising: a collector defining an open top vessel with a closed bottom for collecting water, the collector including a plurality of tapered and curved sidewalls with curved corners connecting the curved sidewalls, the curved sidewalls having a direction of curvature and the curved corners having a direction of curvature opposite the direction of curvature of the curved sidewalls, wherein the curved sidewalls are configured to be flexible when water collected therein freezes and expands, wherein the collector of the rain gauge resists breakage from freezing of collected water.

2. The rain of claim 1, wherein the curvature of the sidewalls is preferably concave, with the curvature being inwardly into the collector and the curvature of the corners is convex, with the curvature being outwardly of the collector.

3. The rain gauge of claim 1, further comprising a planar tapered sidewall having measurement indica thereon.

4. The rain gauge of claim 1, further comprising a three-dimensional projection rising from the closed bottom of the collector, the projection decreasing in dimension as a function of height, wherein the projection is configured to force expanding ice upwards in the collector.

5. The rain gauge of claim 4, wherein the projection comprises a cone.

6. The rain gauge of claim 4, wherein the projection comprises a pyramid.

* * * * *